Nov. 24, 1964   F. L. McMULLEN   3,157,978
LOCKING HUB FOR A ROTARY DISC LAWN MOWER BLADE
Filed June 5, 1963
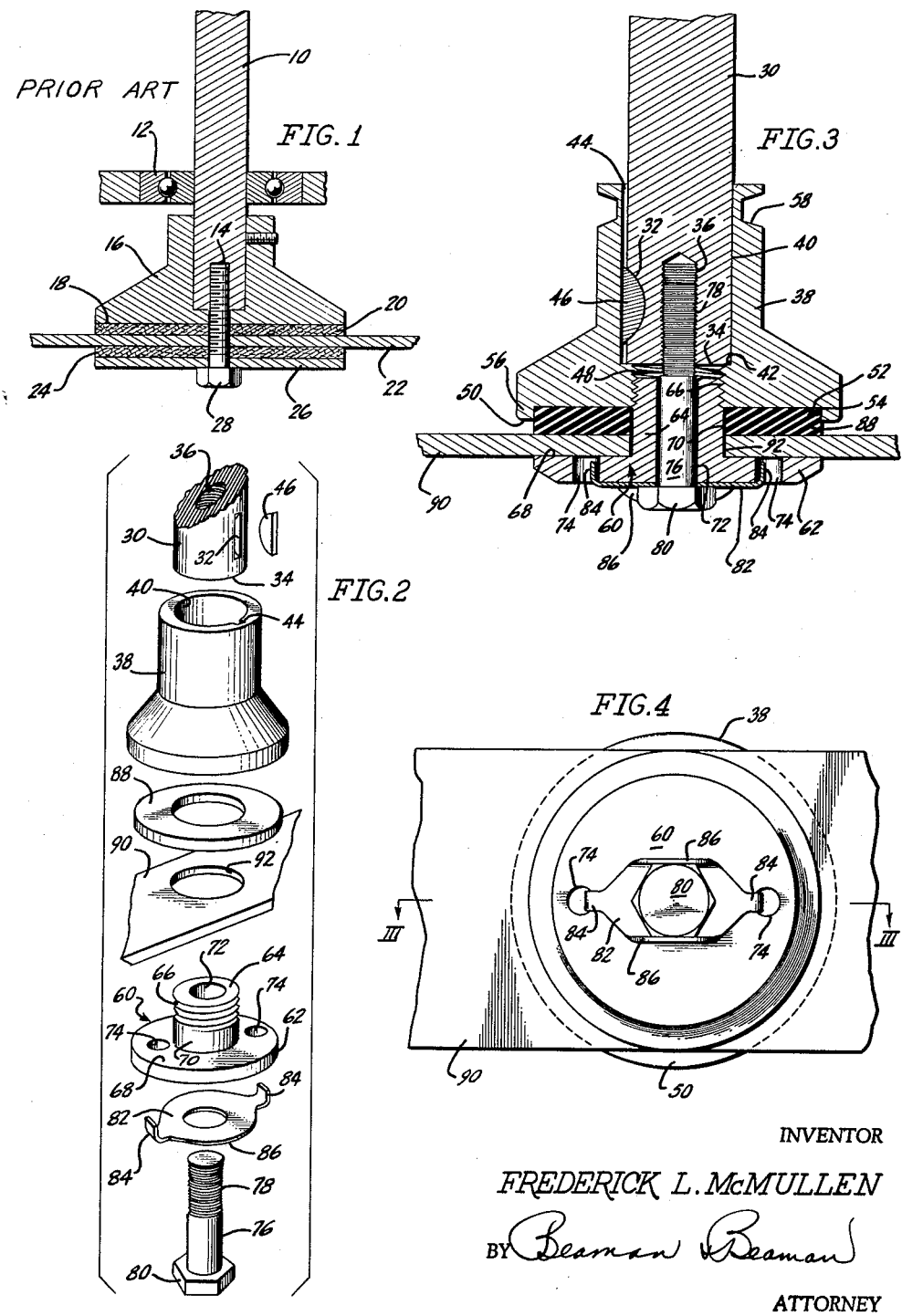
INVENTOR
FREDERICK L. McMULLEN
BY Beaman & Beaman
ATTORNEY

3,157,978
LOCKING HUB FOR A ROTARY DISC
LAWN MOWER BLADE
Frederick L. McMullen, 179 S. West Ave., Hillsdale, Mich.
Filed June 5, 1963, Ser. No. 285,743
9 Claims. (Cl. 56—295)

The invention pertains to a blade adapter for a rotary lawnmower blade, and particularly relates to a locking hub blade adapter having improved safety and operational features.

In the rotary lawnmower art, a blade is affixed to the lower end of a driven shaft whereby the blade rotates in a horizontal plane. A number of types of hub and attachment devices have been employed to affix the blade to the lower end of the driven shaft. These hub devices usually include a friction element wherein the blade is frictionally affixed, rather than rigidly affixed, to the driven shaft whereby slippage may occur permitting relative rotation between the blade and shaft upon the blade striking a heavy or immovable object. Such slippage protects the driven shaft against undue shock and stress.

A common construction employed in the rotary mower blade hub art entails the use of a bolt threaded into a bore coaxially defined in the end of the driven shaft to which the blade is attached. Hub and flange structure is affixed to the shaft wherein the blade is affixed thereon upon tightening of the previously mentioned bolt. This type of construction has several distinct disadvantages from a safety standpoint, in that inadvertent loosening of the bolt permits the blade to loosen on the driven shaft, and upon the bolt completely unthreading from the shaft bore, the blade will drop from the shaft creating a serious hazard. To prevent such an occurrence, lock devices are usually employed with the bolt. However, such lock devices often become damaged and inoperative, in that they are located on the bottom of the hub assembly and are easily damaged during the course of the mower operation.

Additional disadvantages from the above-mentioned conventional blade hub arrangement arise from the stress placed on the bolt. In that the bolt is usually no larger than ⅜" in diameter, due to the diameter of the driven shaft usually being 1" or less, the possibility of the bolt shearing is not unlikely, and should this occur the very rapidly rotating cutting blade would drop to the ground and possibly cause serious injury to the operator of the mower.

It is an object of the invention to provide a self-locking hub blade adapter for rotary mowers wherein the hub assembly is positively locked against accidental disassembly, and the locking action is operative regardless of the direction in which the driven shaft rotates.

Another object of the invention is to provide a self-locking hub blade adapter which may be employed with conventionally driven shafts and wherein the upper and lower portions of the hub blade adapter become a unit whereby no lateral stress is imposed on the shaft-mounted bolt.

Another object of the invention is to provide a self-locking hub blade adapter for use with rotary mower blades wherein any desired frictional interconnection between the blade and hub blade adapter may be produced without affecting the safety, self-locking, and operational characteristics of the hub blade adapter.

Another object of the invention is to provide a self-locking hub blade adapter employing a friction washer wherein means are provided for partially confining the washer to prevent excessive expansion thereof during the compression of the washer, wherein the desired predetermined frictional engagement between the blade and the hub will be maintained once the blade and hub are assembled.

Yet another object of the invention is to provide a self-locking hub blade adapter for rotary lawnmowers employing a shaft bolt to provide a self-locking feature wherein elongation of the shaft bolt does not destroy the self-locking arrangement, as the hub components will automatically retighten themselves against the elongated shaft bolt.

A further object of the invention is to provide a self-locking hub blade adapter wherein a shaft bolt is employed in the blade adapter assembly, yet the strain imposed on the shaft bolt is very small and the possibility of the shaft bolt shearing is negligible.

These and other objects of the invention arising from the details of components and relationships thereof will be apparent from the following description and accompanying drawings wherein:

FIG. 1 is an elevational, sectional view of a conventional driven shaft, hub, and blade assembly employing a shaft bolt, FIG. 2 is a perspective, exploded view of the components of the self-locking hub blade adapter of the invention, the blade also being shown, FIG. 3 is a detail, enlarged, elevational diametrical, sectional view of the self-locking hub blade adapter in assembled relation on a driven shaft, and FIG. 4 is an underside view of the self-locking hub blade adapter assembly shown in FIG. 3.

To aid in appreciation of the inventive concepts, FIG. 1 discloses a typical conventional hub and blade attachment device employing a shaft bolt. The rotary mower driven shaft 10 is mounted within suitable bearings 12, and the shaft is adapted to be driven by an engine or motor in the well-known manner. The shaft 10 may constitute an end of an engine crankshaft. The lower end of the shaft 10 is provided with a threaded, concentric bore 14, and a hub member 16 is mounted on the shaft and includes a lower surface 18 against which an annular friction washer 20 bears, said washer being made of rubber, leather, etc. The rotary mower blade 22 engages the friction washer 20. Another friction washer 24 is located at the underside of the blade 22 and a steel washer 26 engages the underside of the lower friction washer 24. The shaft bolt 28 threads into the shaft bore 14, maintaining the steel washer 26 in engagement with the friction washer 24 and compressing the blade 22 between the washers 20 and 24. Thus, a frictional engagement is produced between the blade 22 and the driven shaft 10.

It will be readily apparent that in the conventional arrangement shown in FIG. 1, should the shaft bolt 28 loosen within the driven shaft bore 14, the frictional engagement between the blade 22 and the driven shaft 10 would be adversely affected. Should the shaft bolt 28 become completely unscrewed from the bore 14, the blade 22 would drop from the shaft and become a serious safety hazard if the blade were rapidly rotating. It will also be appreciated that the arrangement of FIG. 1 imposes substantial bending stresses on the shaft bolt 28 should the blade engage stones, roots, etc., tending to deflect the end of the blade upwardly. Such upward blade deflection tends to tilt the steel washer 26 and, thus, impose a bending and shear stress on the shaft bolt with the attendant possibility of fracturing the bolt.

The assembly of FIG. 1 is maintained by tightening the shaft bolt 28 into engagement with the steel washer 26. To sufficiently tighten the bolt 28, it is necessary to tighten the bolt rather firmly. Thus, the conventional arrangement of FIG. 1 provides very little latitude, if any, in varying the degree of frictional relationship between the blade 22 and the shaft 10 and yet effectively maintain the assembly. Also, in that the direction of threads of the shaft bolt 28 is such that the torque imposed on the blade, due to the resistance encountered during cutting, tends to tighten the shaft bolt into the bore 14, "slippage" of the blade between friction washers often causes rotation of the steel washer 26 and bolt 28 in the tightening direction, thereby increasing the frictional engagement between the blade and the shaft over that which was originally desired.

While the threads of the shaft bolt 28 tend to tighten due to the torque imposed on the blade during operation, should the blade tend to rotate in the reverse direction, the frictional torque forces imposed on the friction washers 20 and 24 and the washer 28 might tend to loosen the bolt 28. Such reverse direction rotation of the blade 22 may occur in those cases where the engine driving the driven shaft 10 backfires and causes reverse rotation of the driven shaft, or reverse rotation of the driven shaft will occur if the driven shaft is driven by a twisted belt arrangement and the belt is improperly installed.

The self-locking hub blade adapter of the invention, which alleviates and minimizes the previously mentioned disadvantages with conventional mower blade hub arrangements, is illustrated in FIGS. 2, 3, and 4. In the practice of the invention, the driven shaft 30 is preferably provided with a key recess 32, and includes a lower end 34 in which a concentric, threaded bore 36 is defined. Preferably, the threads within bore 36 are of the right-hand type.

An annular flange member 38 is adapted to be fixedly mounted on the shaft 30. The flange member 38 includes a concentric, cylindrical bore 40 extending partially therethrough, terminating in a shoulder 42, FIG. 3. A keyway 44 is preferably defined in the flange member bore 40 for reception of the Woodruff key 46 which fixes the driven shaft 30 and the flange member 38 against relative angular rotation. The size of the bore 40 may be such as to be a press fit connection with the driven shaft 30, or set-screw means or other conventional fastening means may be employed to prevent the flange member 38 from slipping off the end of the driven shaft. It will be appreciated from FIG. 3 that the lower end 34 of the driven shaft abuttingly engages the bore shoulder 42.

The flange member 38 is also provided with a concentric, threaded bore 48 having right-hand threads defined therein which are of a greater pitch than those of the threads within shaft bore 36.

The flange member 38 includes a radially extending portion having a lower surface 50 in which is defined a recessed portion 52. The recessed portion 52 is defined by an axially extending shoulder 54 defined by the annular lip 56. If desired, a V-belt groove 58 may be formed on the flange member to power self-propelling lawn-mowers, as shown in FIG. 3.

A lock cap 60 includes a radially extending flange 62 and an axially extending stem 64 having threads 66 defined thereon adapted to matingly engage and cooperate with the threads of the flange member bore 48. The flange 62 is provided with an upper surface 68, and the stem 64 is provided with a cylindrical wall portion 70. The lock cap 60 is also axially bored as at 72 and may be provided with a pair of diametrically disposed holes 74 defined in the flange thereof for receiving a nut-lock member, as will be apparent later.

A shaft or lock bolt 76 is adapted to be inserted through the lock cap bore 72, and is provided with threads 78 adapted to matingly engage with the threads of the shaft bore 36. The bolt 76 is provided with a hexagonal-shaped head 80, as will be apparent from FIG. 4. Relative rotation between the bolt 76 and the lock cap 60 is prevented by a lock member 82 having ends 84 inserted into the lock cap holes 74 and side portions 86 which may be bent downwardly encompassing opposite flats of the bolt head 80.

An annular friction washer 88 circumscribes the cylindrical stem portion 70, and is received within the recessed portion 52 of the flange member 38. The washer 88 will be formed of a friction material such as rubber, leather, etc.

The rotary mower blade 90 is usually of a generally planar configuration, as is conventional, and includes a hole 92 adapted to receive the cylindrical portion 70 of the stem 64.

The self-locking hub blade adapter components are assembled as in FIG. 3 wherein the washer 88 is interposed between the recessed portion 52 of the flange member and the blade 90, and the flange 62 of the lock cap engages the underside of the blade. The threads 66 of the stem thread into the flange member threaded bore 48, and the lock bolt 76 is threaded into the bore 36 wherein the head 80 of the bolt is brought snugly against the underside of the lock cap 60, or against the lock member 82, if a lock member 82 is being employed.

The lock bolt 76 functions to prevent loosening of the lock cap 60 in that the pitch of the threads 78 of the lock bolt are less than the pitch of the threads 66 of the stem 64. Thus, even though the threads of the stem 64 and the lock bolt 76 are of a like hand, any rotation of the lock stem 64 in the loosening direction will cause the lock stem to bindingly engage the head of the lock bolt even though the lock bolt 76 and the lock cap 60 are tending to be rotated in the loosening direction with equal angular velocities. To unscrew the lock cap 60, it is necessary to rotate the lock bolt 76 in the loosening direction at a faster rate than the lock cap is being rotated, or the lock bolt must be completely removed from the bore 36 to permit the lock cap to be unscrewed.

To prevent vibration from loosening the lock bolt 76, the sheet metal lock member 82 is employed to prevent relative rotation between the lock bolt 76 and the lock cap 60.

When installing a blade on the self-locking hub blade adapter of the invention, the stem 64 is inserted through the hole 92 of the blade, and the lock cap 60 is threaded into the bore 48 to produce the desired frictional compression and engagement of the blade 90 with the friction washer 88. Upon the desired compression of the friction washer being obtained to produce the desired frictional interconnection between the blade and the driven shaft 30, the lock bolt 76 is inserted into the lock cap bore 72 and is threaded into the bore 36. It is only necessary that the bolt 76 be threaded into the bore 36 "finger tight" wherein the head of the lock bolt is merely snugly engaging the nut locking member 82 to prevent loosening or disassembling of the lock cap from the flange member. To prevent rotation of the lock cap 60 in a tightening direction, which would increase the frictional engagement between the blade 90 and the washer 88, the lock bolt 76 may be tightened with a wrench to produce a firm binding action on the threads 66 and those of bore 48, which will resist rotation of the lock cap 60 in a tightening direction.

The above described construction provides a self-locking hub blade adapter which locks the blade to the adapter regardless of the direction of the rotation of the blade, in that the lock cap 60 cannot become unscrewed due to the lock bolt 76. In that the construction permits a relatively large diameter stem 64 to be employed for a given diameter of driven shaft, a very substantial and high strength connection may be achieved between the blade and the shaft, and as the stresses imposed on the driven shaft 30 by the blade 90 are transmitted solely by the lock cap 60 and flange member 38, no significant stresses are imposed on the lock bolt 76 as with prior art constructions. Also, due to the self-locking features of the hub blade adapter, any desired degree of frictional engagement between the blade and the driven shaft may be produced without adversely affecting the assembly of the blade on the driven shaft. If only a relatively "loose" engagement between the friction washer 88 and the blade 90 is desired, the lock cap 60 is only snugly tightened against the blade 90, yet the use of the lock bolt 76 will prevent the lock cap from unscrewing from the flange member 38.

The invention also insures maintenance of the predetermined and desired frictional engagement between the washer 88 and the blade 90 by employing the recessed portion 52 which partially encompasses the washer, whereby shoulder 54 will prevent the washer 88 from excessively, radially expanding due to the compressive forces imposed thereon. If desired, an annular bronze or other type of friction washer may be interposed between the lower side of the blade 90 and the upper surface 68 of the flange of the lock cap 60.

A significant feature of the self-locking action produced by the hub blade adapter of the invention is considered to lie in the fact that the threads of both the lock cap stem 64 and the lock bolt 76 are of a right-hand. As it is desired to periodically remove the blade of a rotary lawnmower for sharpening or replacement, the fact that both the lock bolt and the lock cap must be rotated in the counterclockwise direction to disassemble the hub, simplifies the disassembly over locking arrangements wherein both right- and left-hand threads are used. Locking arrangements employing both left- and right-hand threads often cause considerable confusion and frustration if the existence of a left-hand thread is unknown. This problem will not occur with the self-locking hub and blade adapter of the invention. It will be appreciated that both threads 66 and 78 could be of a left-hand direction and still practice the inventive concept, yet such construction would be undesirable for the reason mentioned above and the fact that the usual cutting forces imposed on rotary lawnmower blades are normally in the right-hand direction.

It is to be understood that various modifications to the invention may be apparent to those skilled in the art without departing from the spirit and scope thereof, and it is intended that the invention be defined only by the scope of the following claims.

I claim:

1. A locking hub blade adapter for a rotary lawnmower comprising, in combination, a driven shaft having an end, a flange member, a first bore defined in said flange member adapted to fixedly receive said end of said driven shaft, a threaded bore defined in said flange member concentric with said first bore, a radially extending lower surface defined on said flange member, a lock cap, a radially extending flange defined on said lock cap having an upper and a lower surface, a threaded stem defined on said lock cap adapted to matingly cooperate with the threads defined in said threaded bore of said flange member, a concentric, threaded bore defined in said end of said shaft, a bore defined in said lock cap concentrically extending through said stem, a threaded lock bolt extending through said lock cap bore mating with the threads of said threaded bore defined in said shaft, a shoulder defined on said bolt adapted to operatively abut said lock cap lower surface upon tightening of said bolt into said shaft, the threads of said stem and said lock bolt being of like hand and different pitch, the pitch of the threads of said stem being greater than that of the threads of said lock bolt, a rotary mower blade being adapted to be clamped between said lower surface of said flange member and the upper surface of said lock cap.

2. In a locking hub blade adapter, as in claim 1, wherein bolt locking means are interposed between said lock cap and said lock bolt preventing relative rotation therebetween.

3. A locking hub blade adapter for a rotary lawnmower comprising, in combination, a driven shaft having an end, a flange member, a first bore defined in said flange member adapted to receive said end of said driven shaft, means fixing said shaft to said flange member preventing relative rotation therebetween, a threaded bore defined in said flange member concentric to said first bore, a radially extending flange defined on said flange member having a lower surface, a lock cap, a radially extending flange defined on said lock cap having an upper and lower surface defined thereon, a threaded stem defined on said lock cap adapted to matingly cooperate with the threads defined in said threaded bore of said flange member, a bore defined in said lock cap concentrically extending through said stem, a concentric, threaded bore defined in the end of said shaft, a threaded lock bolt having a head and extending through said bore defined in said lock cap mating with the threads of said threaded bore defined in said shaft, the head of said bolt adapted to effectively abut said lower surface of said lock cap upon being threaded into said shaft threaded bore, the threads of said stem and lock bolt being of a like hand and a different pitch, the pitch of the threads of said stem being greater than that of the threads of said lock bolt, a rotary lawnmower blade being adapted to be clamped between said lower surface of said flange member and the upper surface of said lock cap.

4. In a locking hub blade adapter, as in claim 3, wherein said flange member lower surface includes a recessed portion, and a friction washer within said recessed portion interposed between said flange member and the blade.

5. A locking hub blade adapter and blade assembly for a rotary lawnmower comprising, in combination, a driven shaft having an end, a flange member, a first bore defined in said flange member adapted to receive said end of said driven shaft, means fixing said shaft to said flange member preventing relative rotation therebetween, a threaded bore defined in said flange member concentric to said first bore, a radially extending flange defined on said flange member having a lower surface, a lock cap, a radially extending flange defined on said lock cap having an upper and lower surface defined thereon, a threaded stem defined on said lock cap adapted to matingly cooperate with the threads defined in said threaded bore of said flange member, a bore defined in said lock cap concentrically extending through said stem, a concentric, threaded bore defined in the end of said shaft, a threaded lock bolt having a head and extending through said bore defined in said lock cap mating with the threads of said threaded bore defined in said shaft, the head of said bolt adapted to effectively abut said lower surface of said lock cap upon being threaded into said shaft threaded bore, the threads of said stem and lock bolt being of a like hand and a different pitch, the pitch of the threads of said stem being greater than that of the threads of said lock bolt, a friction washer encompassing said stem and disposed adjacent said flange member lower surface, a rotary lawnmower blade, a hole defined in said blade, said stem being inserted through said blade hole, said blade being clamped between said washer and said upper surface of said lock cap.

6. In a locking hub blade and blade assembly for a rotary lawnmower, as in claim 5, wherein a recessed portion is defined in the lower surface of said flange member, said recessed portion being defined by an axially extending annular shoulder, said friction washer being partially received within said recessed portion whereby said shoulder confines said washer against excessive radial expansion.

7. A locking hub blade adapter for a rotary lawnmower comprising, in combination, a drive shaft, a blade-supporting portion defined on said shaft, a first threaded bore defined in said portion, a second threaded bore defined in said portion concentric with said first bore, the pitch of the threads of said first bore being of a like hand and greater than the pitch of the threads of said second bore, a lock cap, threads defined on said lock cap adapted to mate with the threads of said first bore, a lock bolt having threads defined thereon adapted to be received within said second bore, and abutment means defined on said lock bolt adapted to operatively abut said lock cap on threading said bolt into said second bore.

8. A locking hub blade adapter for a rotary lawnmower comprising, in combination, a driven shaft, a blade-supporting portion defined on said shaft, a first threaded bore defined in said portion, a second threaded bore defined in said portion concentric with said first bore, the pitch of the threads of said first bore being of a like hand and greater than the pitch of the threads of said second bore, a lock cap, threads defined on said lock cap adapted to mate with the threads of said first bore, a lock bolt having threads defined thereon adapted to be received within said second bore, a head defined on said lock bolt adapted to operatively abut said lock cap upon threading said bolt into said second bore, and lock means preventing rotation of said lock bolt relative to said lock cap.

9. A locking hub blade adapter for a rotary lawn-mower comprising, in combination, a driven shaft, a blade-supporting portion defined on said shaft, a first threaded bore defined in said portion, a second threaded bore defined in said portion concentric with said first bore, the pitch of the threads of said first bore being of a like hand and greater than the pitch of the threads of said second bore, a lock cap, threads defined on said lock cap adapted to mate with the threads of said first bore, a lock bolt having threads defined thereon adapted to be received within said second bore, a friction washer interposed between said lock cap and said blade-supporting portion, and a head defined on said lock bolt adapted to operatively abut said lock cap upon threading said bolt into said second bore.

References Cited in the file of this patent
UNITED STATES PATENTS
2,651,530     Blydenburgh _____ Sept. 8, 1953